United States Patent
Masuda et al.

(10) Patent No.: US 9,924,126 B2
(45) Date of Patent: Mar. 20, 2018

(54) AUDIOVISUAL APPARATUS

(71) Applicant: Saturn Licensing LLC, New York, NY (US)

(72) Inventors: Hiroshi Masuda, Tokyo (JP); Tamotsu Saito, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 14/410,371

(22) PCT Filed: May 17, 2013

(86) PCT No.: PCT/JP2013/063758
§ 371 (c)(1),
(2) Date: Dec. 22, 2014

(87) PCT Pub. No.: WO2014/002640
PCT Pub. Date: Jan. 3, 2014

(65) Prior Publication Data
US 2015/0326815 A1    Nov. 12, 2015

(30) Foreign Application Priority Data
Jun. 29, 2012 (JP) .................................. 2012-147644

(51) Int. Cl.
*H04R 5/02* (2006.01)
*H04N 5/64* (2006.01)
(Continued)

(52) U.S. Cl.
CPC .............. *H04N 5/642* (2013.01); *H04R 5/04* (2013.01); *H04S 3/002* (2013.01); *H04R 1/323* (2013.01);
(Continued)

(58) Field of Classification Search
CPC ................................. H04R 5/02; H04N 5/642
See application file for complete search history.

(56) References Cited

U.S. PATENT DOCUMENTS 5,680,464 A   10/1997   Iwamatsu
6,335,974 B1   1/2002   Kunimoto
(Continued)

FOREIGN PATENT DOCUMENTS

CN   1857031 A   11/2006
EP   1435755 A2   7/2004
(Continued)

OTHER PUBLICATIONS

International Search Report based on PCT/JP2013/063758, dated Jul. 2, 2013, 2 pgs.

(Continued)

*Primary Examiner* — Simon King
(74) *Attorney, Agent, or Firm* — Lerner, David, Littenberg, Krumholz & Mentlik, LLP

(57) ABSTRACT

An audiovisual apparatus includes: a display section configured to display a picture; and one or a plurality of main speakers and a plurality of sub-speakers each having a sound output surface generating sound corresponding to the picture. The sound output surfaces of one or more of the plurality of sub-speakers are arranged to be inclined toward outside of the display section as compared with the sound output surfaces of the main speakers.

10 Claims, 13 Drawing Sheets

(51) Int. Cl.
*H04R 5/04* (2006.01)
*H04S 3/00* (2006.01)
*H04S 7/00* (2006.01)
*H04R 1/32* (2006.01)

(52) U.S. Cl.
CPC .......... *H04R 5/02* (2013.01); *H04R 2201/025* (2013.01); *H04R 2205/022* (2013.01); *H04R 2499/15* (2013.01); *H04S 7/301* (2013.01); *H04S 7/307* (2013.01); *H04S 2400/01* (2013.01); *H04S 2400/13* (2013.01)

(56) References Cited

U.S. PATENT DOCUMENTS

| | | | |
|---|---|---|---|
| 8,150,093 B2 | 4/2012 | Ueno | |
| 8,553,914 B2* | 10/2013 | Fletcher | H04S 1/002 381/300 |
| 2002/0146139 A1* | 10/2002 | Oplinger | H04R 5/02 381/300 |
| 2003/0123690 A1 | 7/2003 | Polk et al. | |
| 2004/0135476 A1* | 7/2004 | Gillengerten | H04R 5/02 312/8.16 |
| 2004/0258259 A1* | 12/2004 | Koyama | H04R 5/04 381/307 |
| 2005/0265559 A1* | 12/2005 | Asada | H04S 7/301 381/18 |
| 2007/0147648 A1* | 6/2007 | Koizumi | H04R 1/028 381/386 |
| 2007/0195964 A1* | 8/2007 | Yokota | H04R 5/02 381/26 |
| 2007/0211904 A1* | 9/2007 | Sakagami | H04S 3/002 381/17 |
| 2007/0274547 A1* | 11/2007 | Ueno | H04N 5/642 381/306 |
| 2008/0080730 A1 | 4/2008 | Takakusaki | |
| 2008/0240474 A1* | 10/2008 | Sakamoto | H04R 5/02 381/300 |
| 2010/0054483 A1 | 3/2010 | Mizuno et al. | |
| 2010/0235745 A1 | 9/2010 | Shintani | |
| 2011/0080531 A1* | 4/2011 | Tanaka | H03G 5/00 348/738 |
| 2012/0155651 A1* | 6/2012 | Obata | H04S 3/002 381/17 |
| 2013/0083255 A1 | 4/2013 | Hiratomo et al. | |

FOREIGN PATENT DOCUMENTS

| | | | |
|---|---|---|---|
| EP | 1667488 A1 | 6/2006 | |
| GB | 2239763 A * | 7/1991 | H04N 5/642 |
| JP | 07-336799 | 12/1995 | |
| JP | EP 0725540 A2 * | 8/1996 | H04N 5/642 |
| JP | 2003101906 A | 4/2003 | |
| JP | 2003102086 A | 4/2003 | |
| JP | 2004-247890 A | 9/2004 | |
| JP | 2005244578 A | 9/2005 | |
| JP | 2005-286987 A | 10/2005 | |
| JP | 2006-109241 A | 4/2006 | |
| JP | 2006-352579 A | 12/2006 | |
| JP | 2007-318301 A | 12/2007 | |
| JP | 2010-016573 A | 1/2010 | |
| JP | 2010056846 A | 3/2010 | |
| JP | 5032463 B2 | 9/2012 | |
| WO | 2007/108301 A1 | 9/2007 | |

OTHER PUBLICATIONS

Extended European Search Report for EP Application No. 13809086.5, dated Nov. 23, 2015.
Russian Office Action for Application No. 2014152103, dated Mar. 14, 2017.
Japanese Office Action for Application No. 2014-522480 dated Mar. 28, 2017.
Chinese Office Action for Application No. CN201380032954.4 dated Mar. 3, 2016.
Chinese Office Action for Application No. CN201380032954.4 dated Dec. 7, 2016.

* cited by examiner

[ FIG. 1 ]
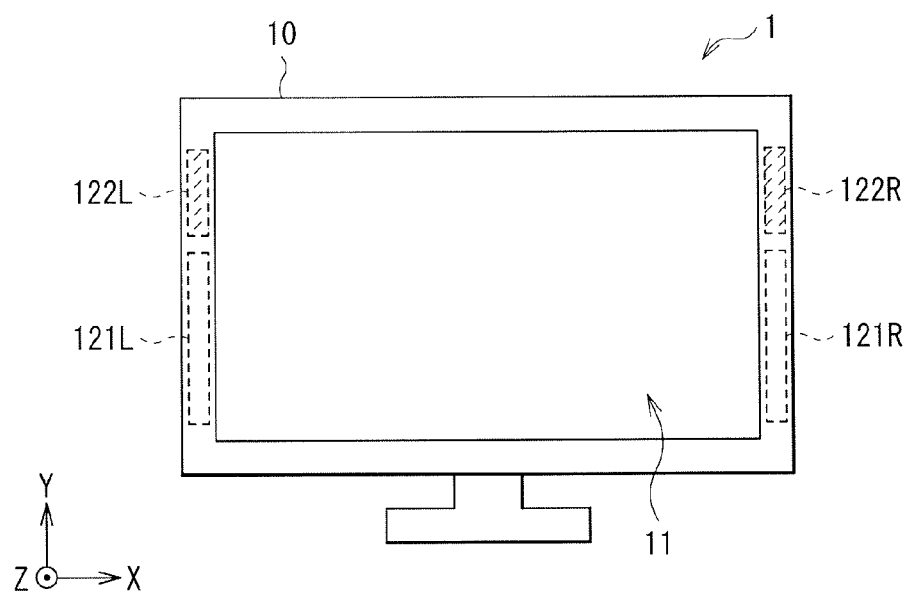
[ FIG. 2 ]
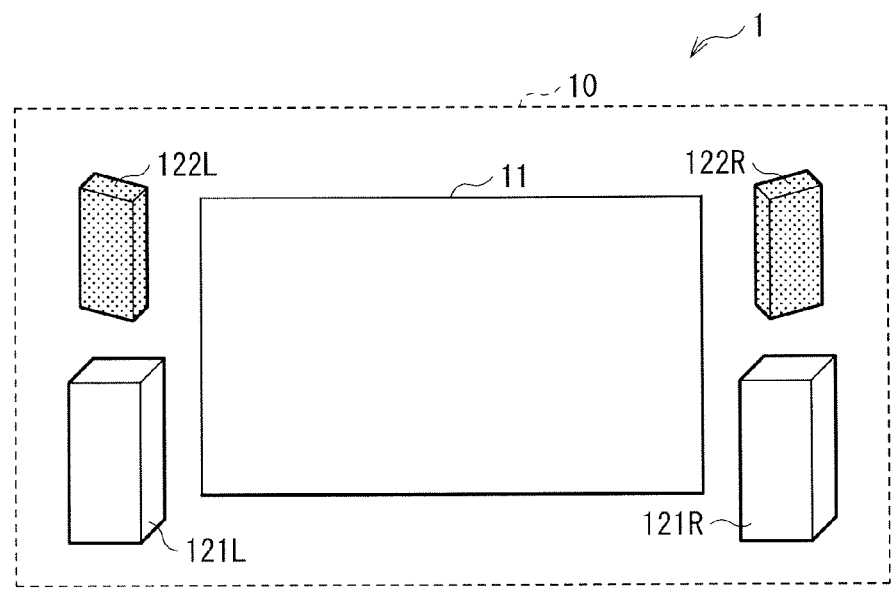

[ FIG. 3 ]
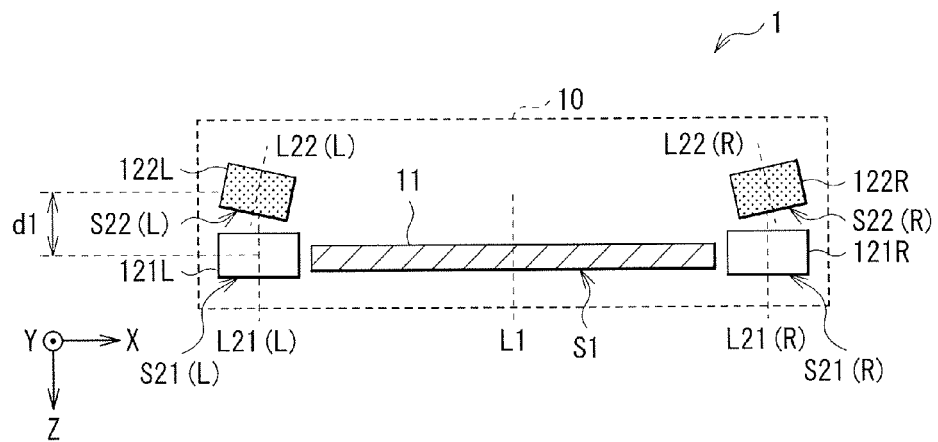
[ FIG. 4 ]
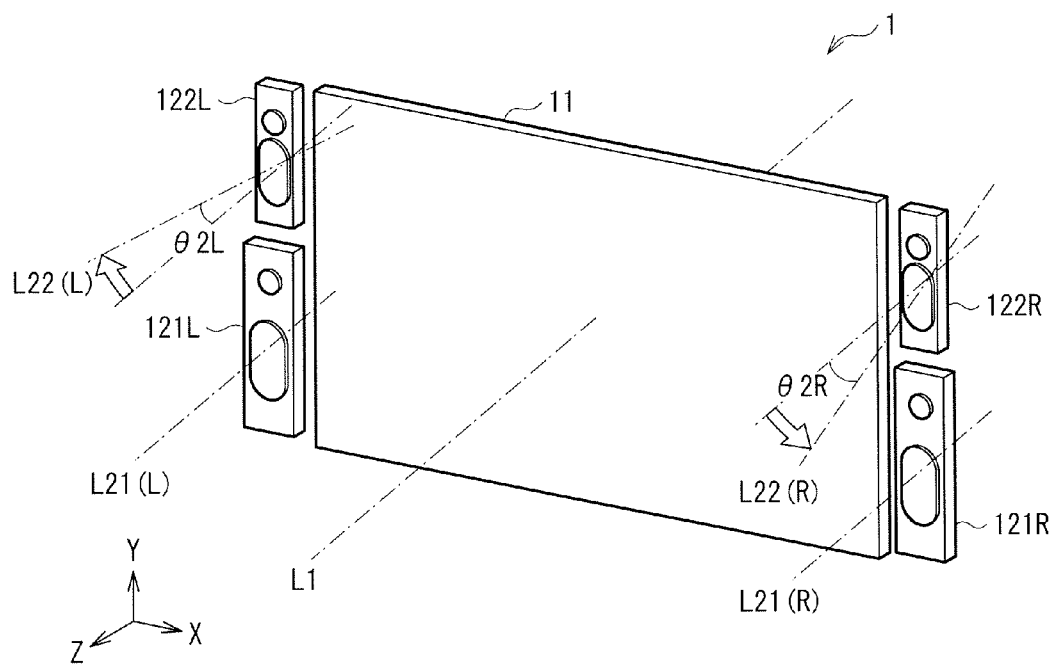

[FIG.5]
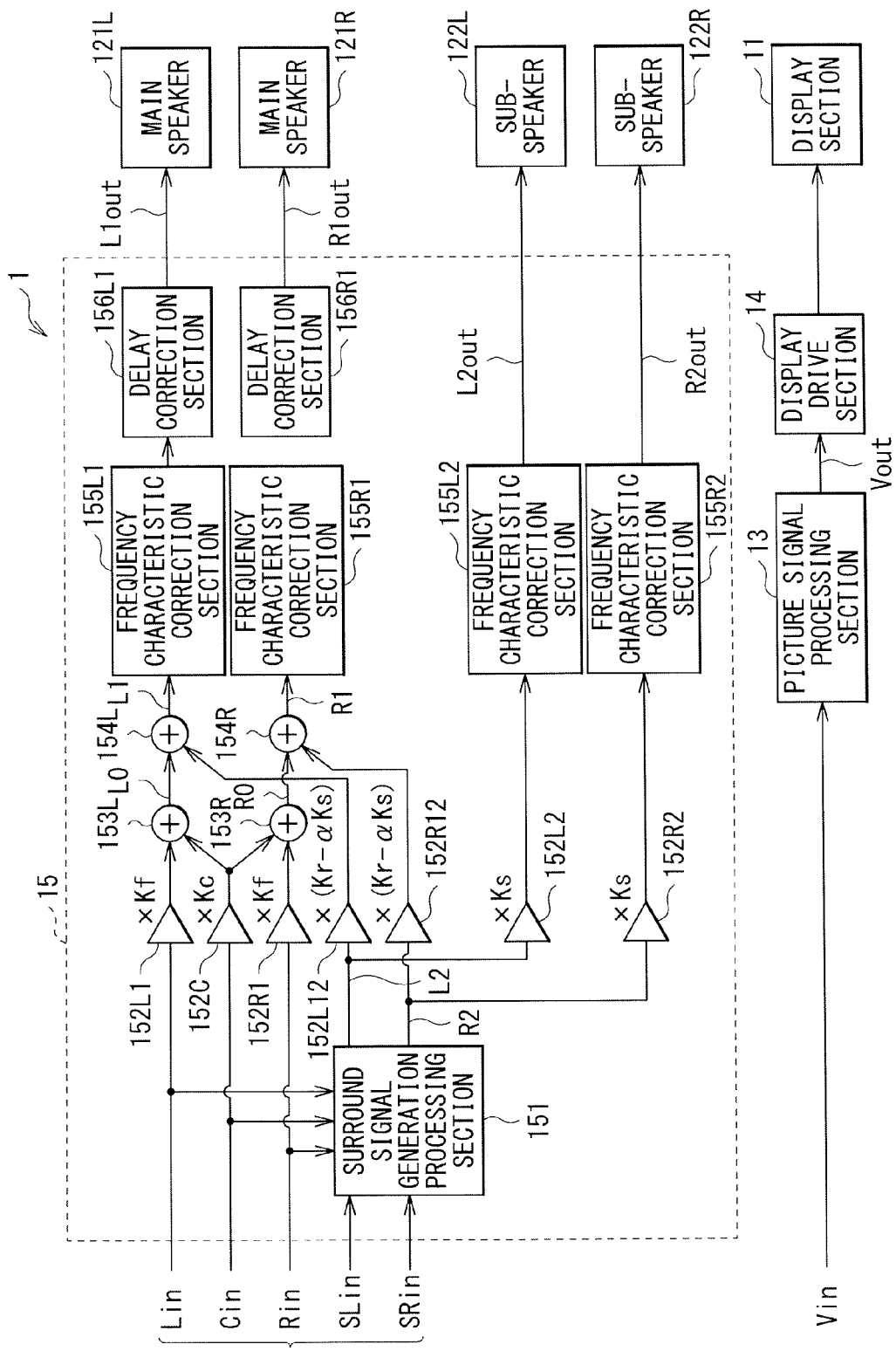

[ FIG. 6 ]
COMPARATIVE EXAMPLE
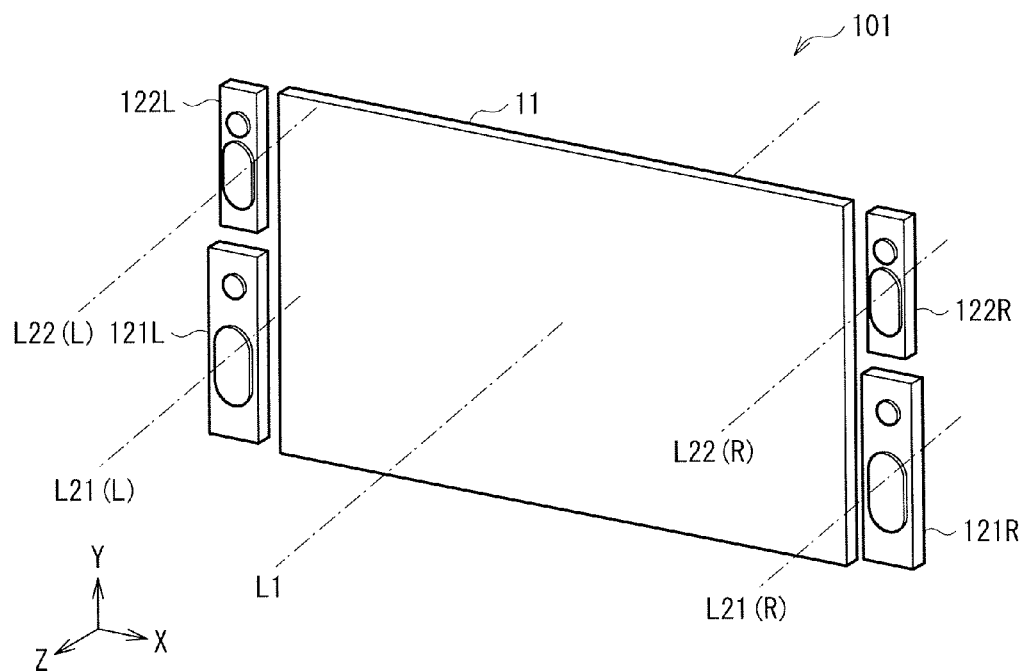

[ FIG. 7 ]
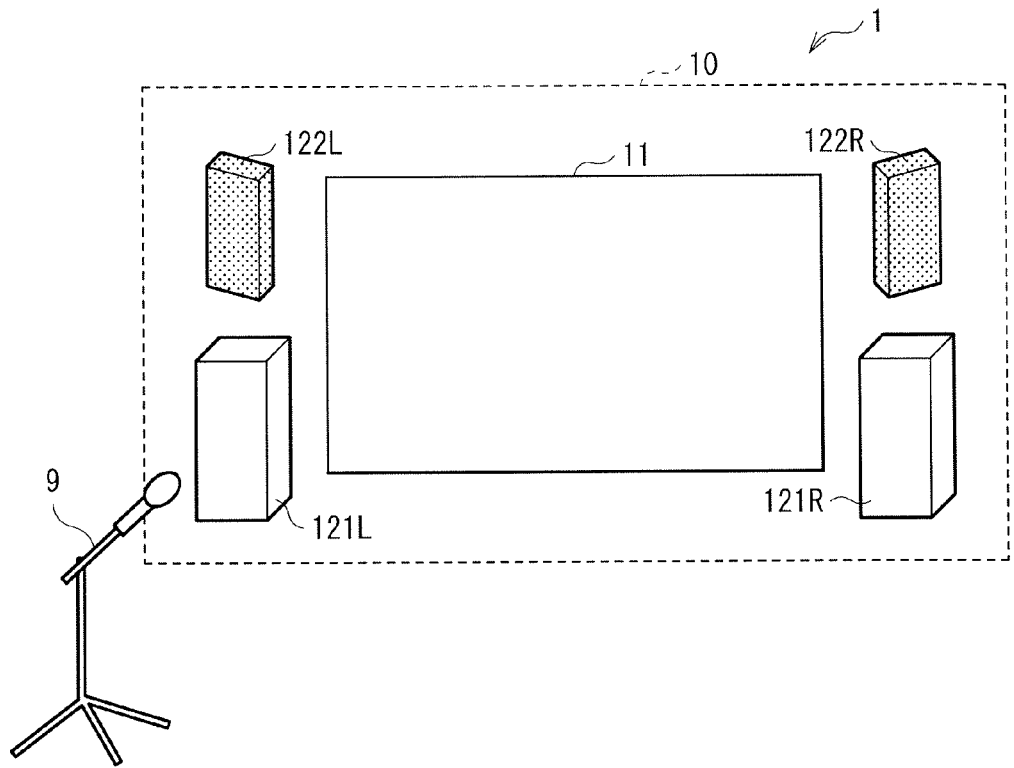
[ FIG. 8 ]
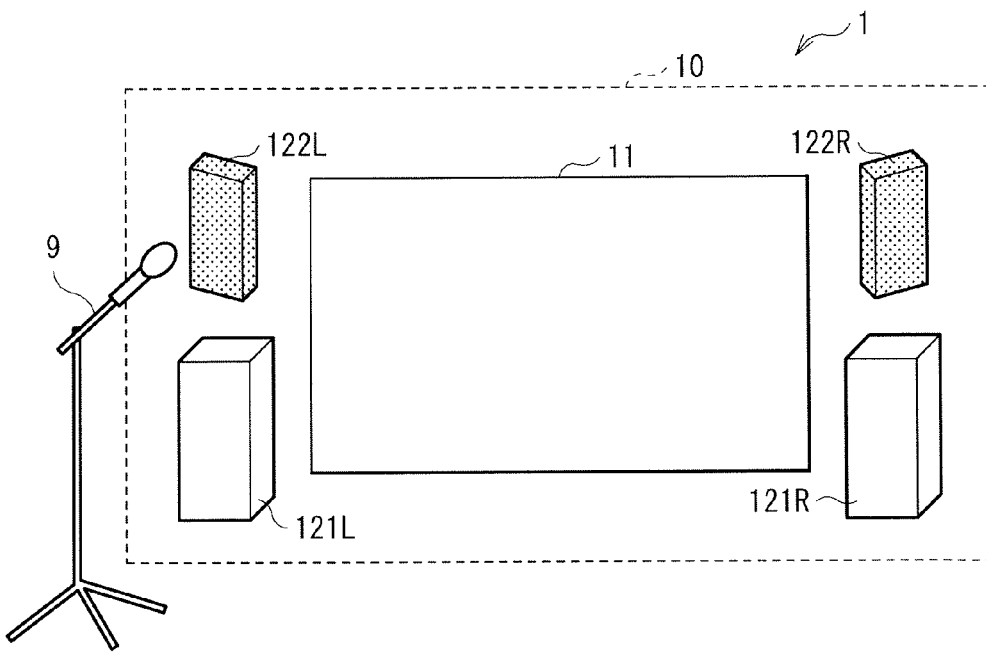

[ FIG. 9A ]
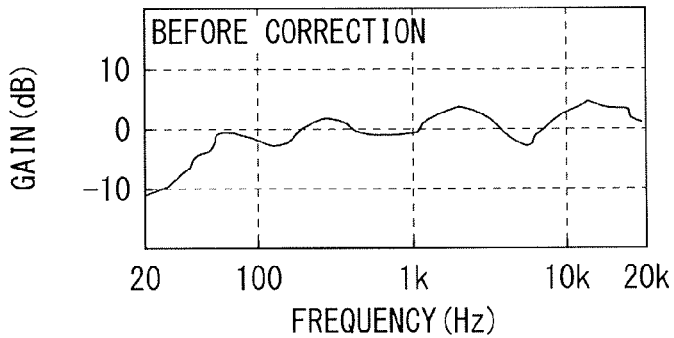
[ FIG. 9B ]
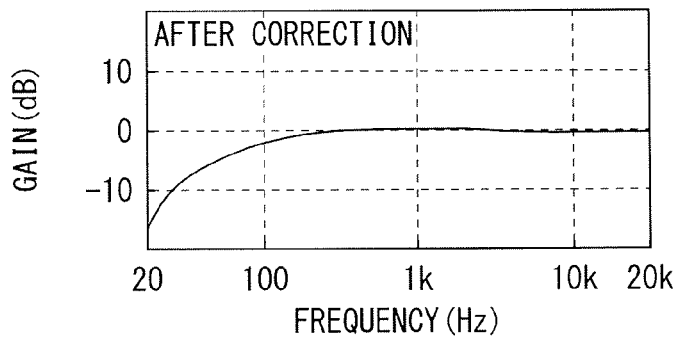
[ FIG. 10A ]
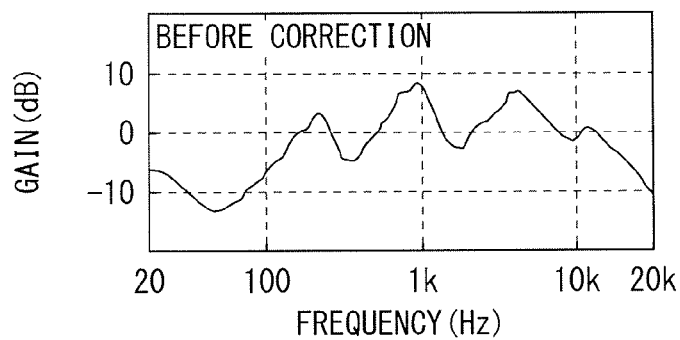
[ FIG. 10B ]
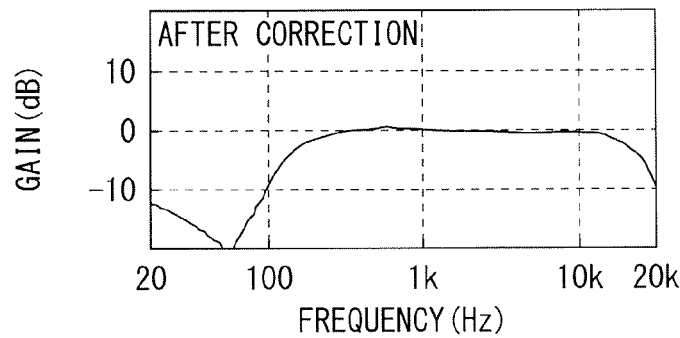

[ FIG. 11 ]
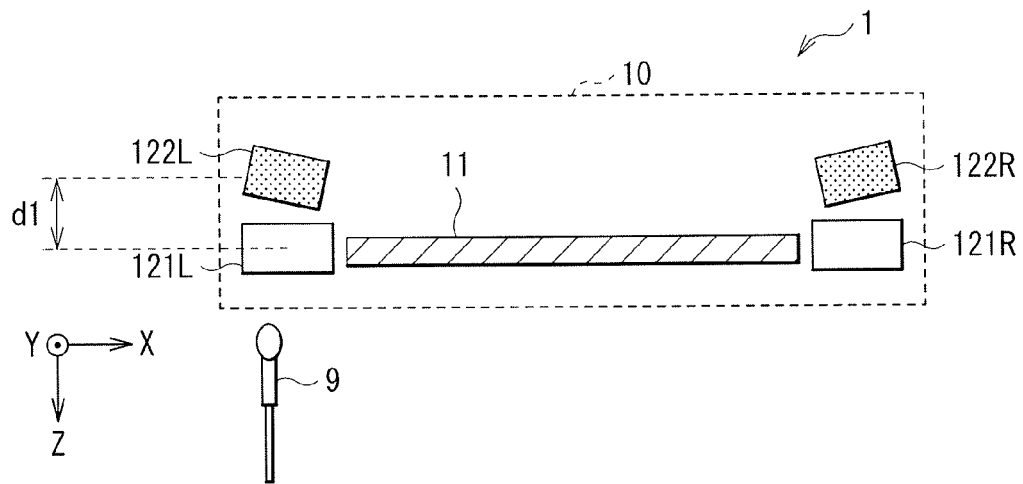
[ FIG. 12A ]
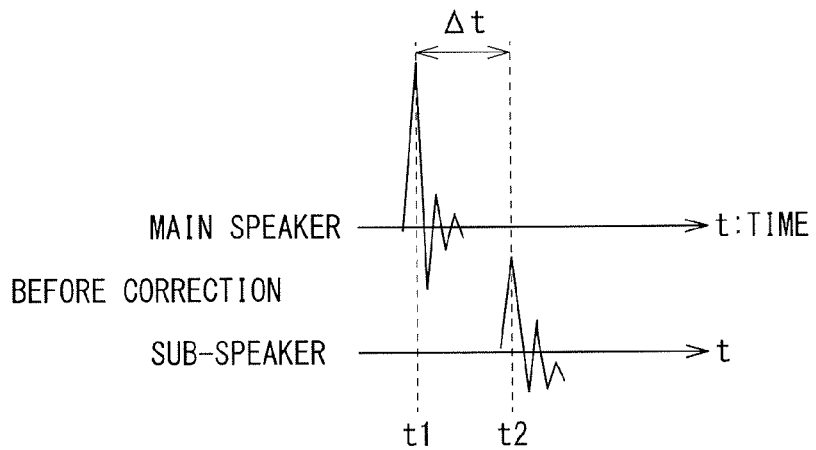
[ FIG. 12B ]
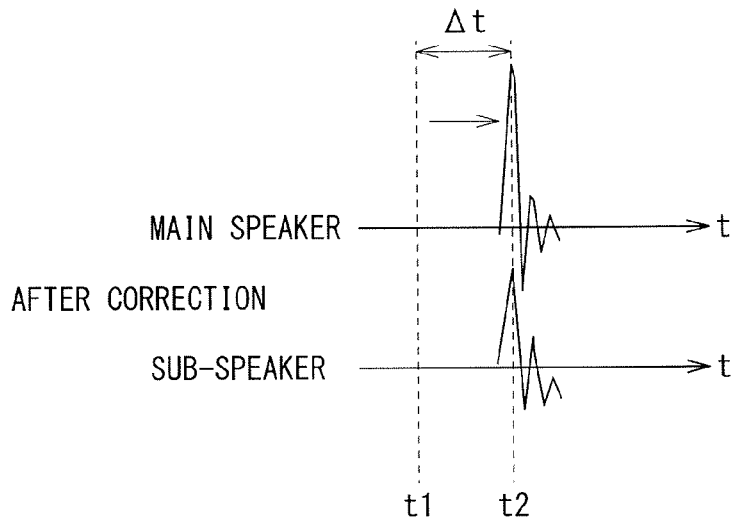

[ FIG. 13 ]
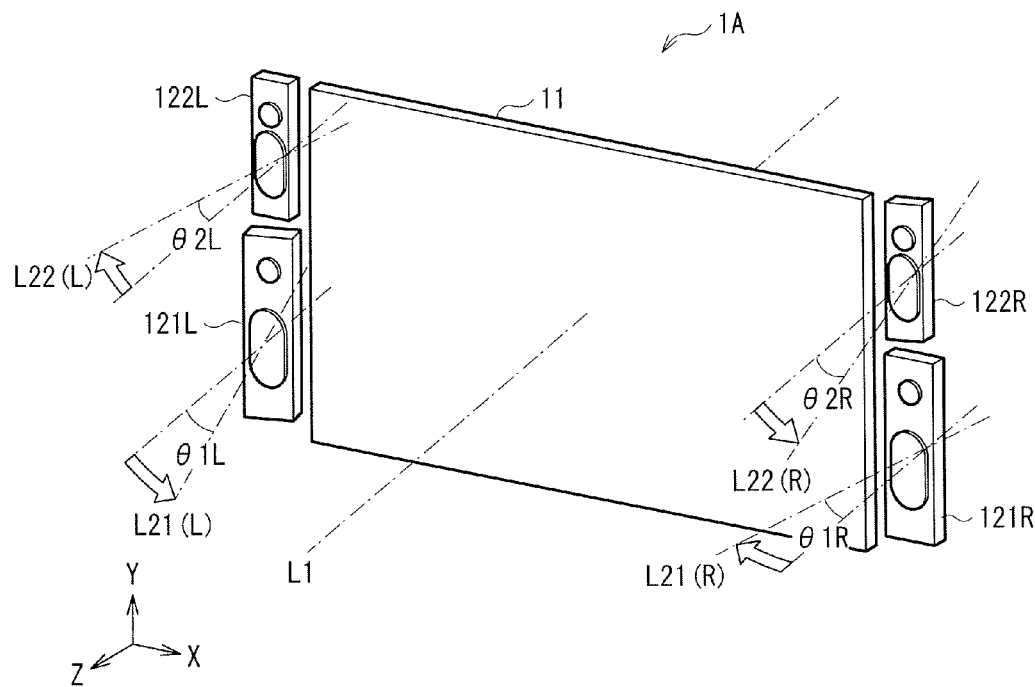
[ FIG. 14 ]
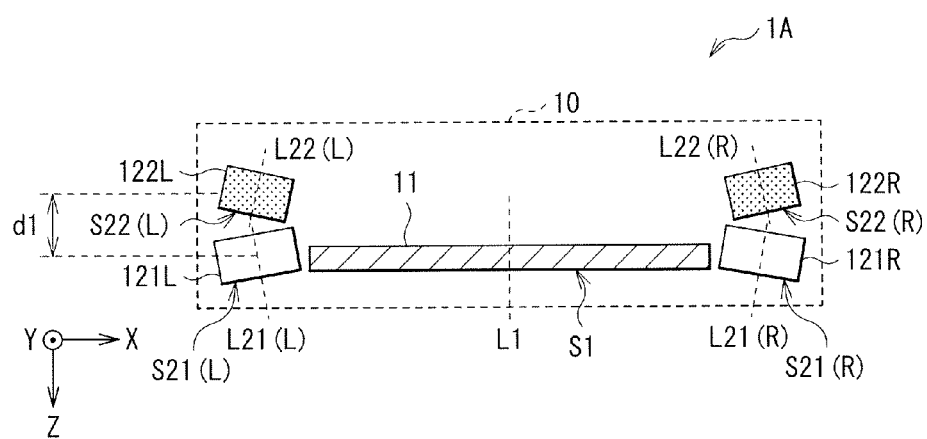

[ FIG. 15 ]
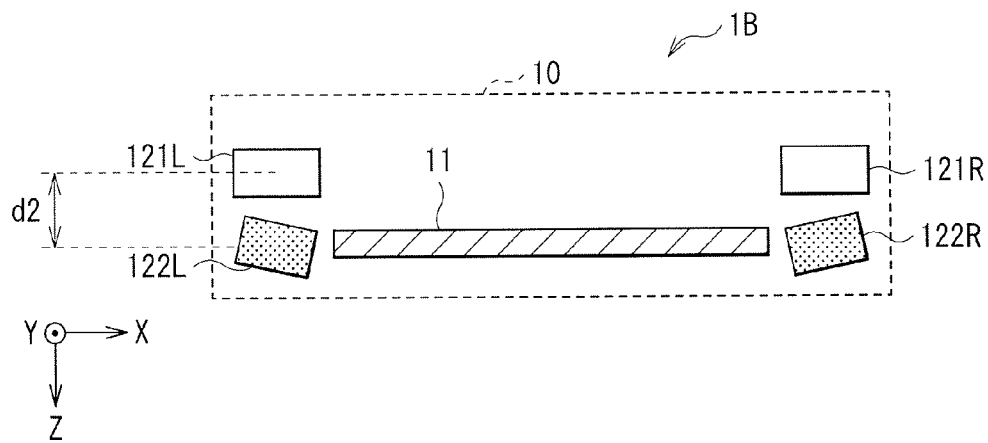
[ FIG. 16 ]
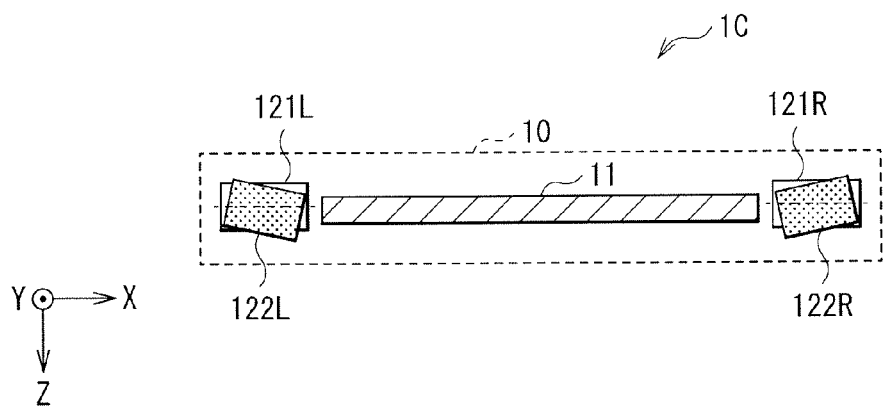

[ FIG. 17 ]
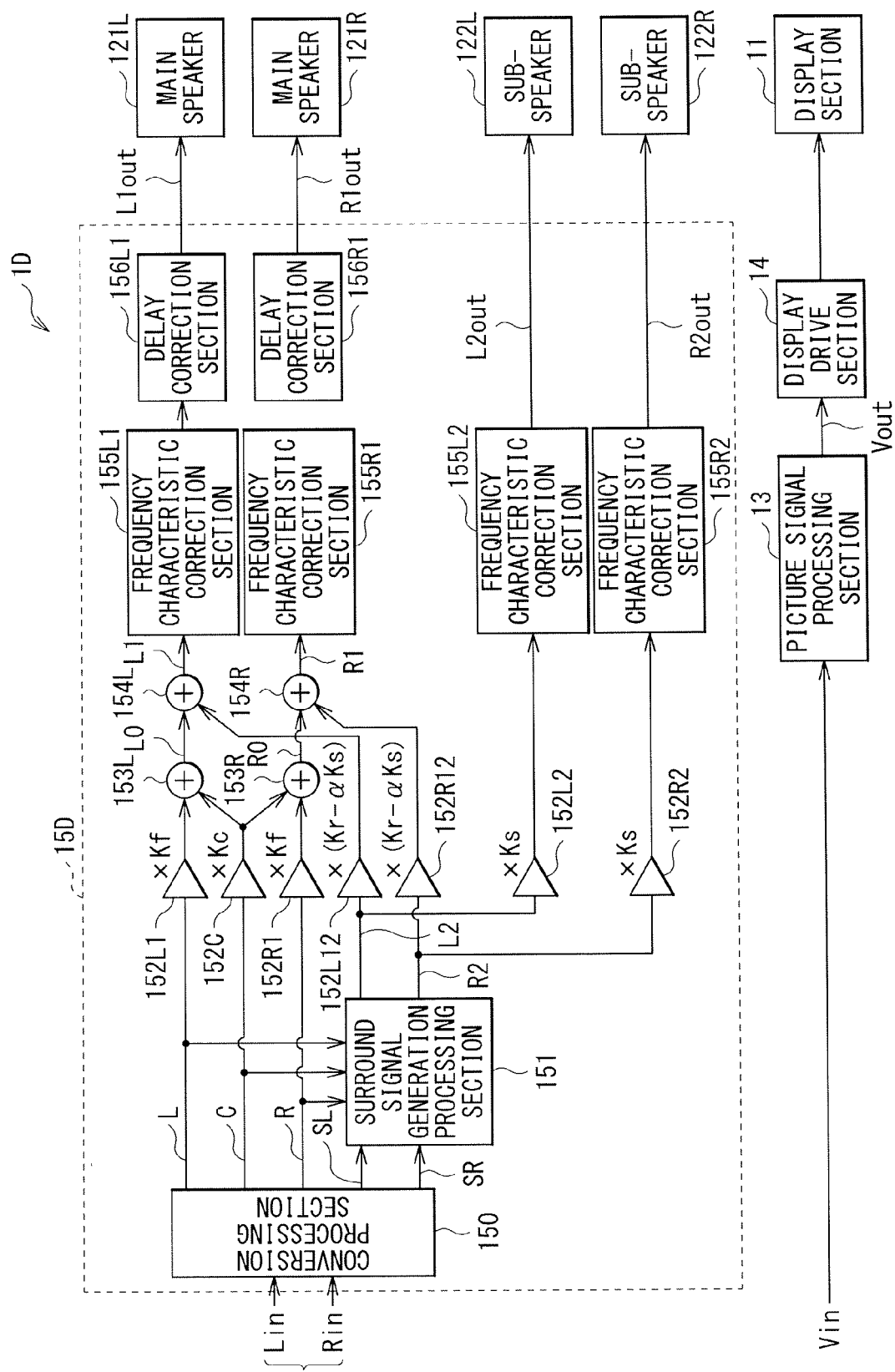

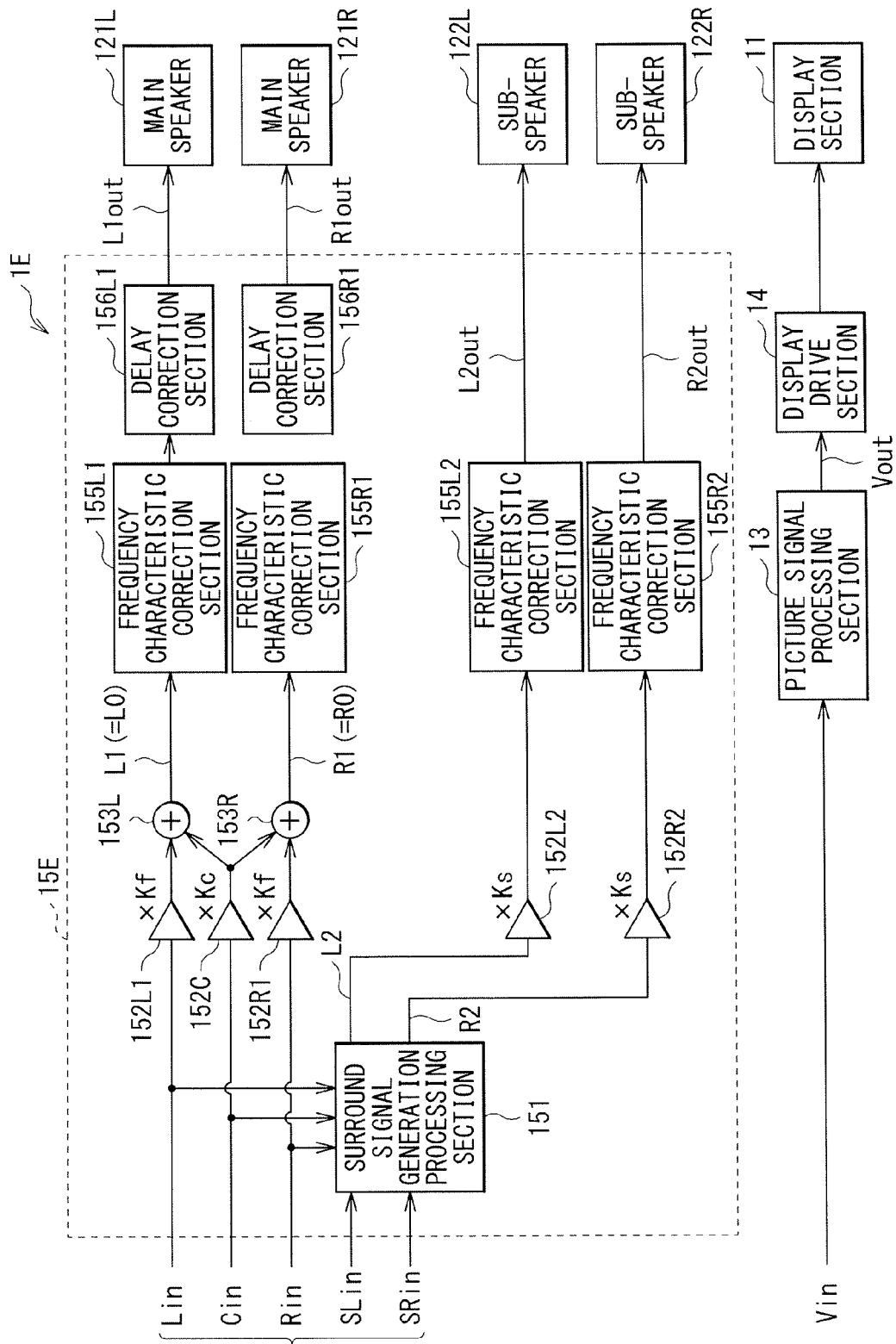
[FIG. 18]

[FIG. 19]
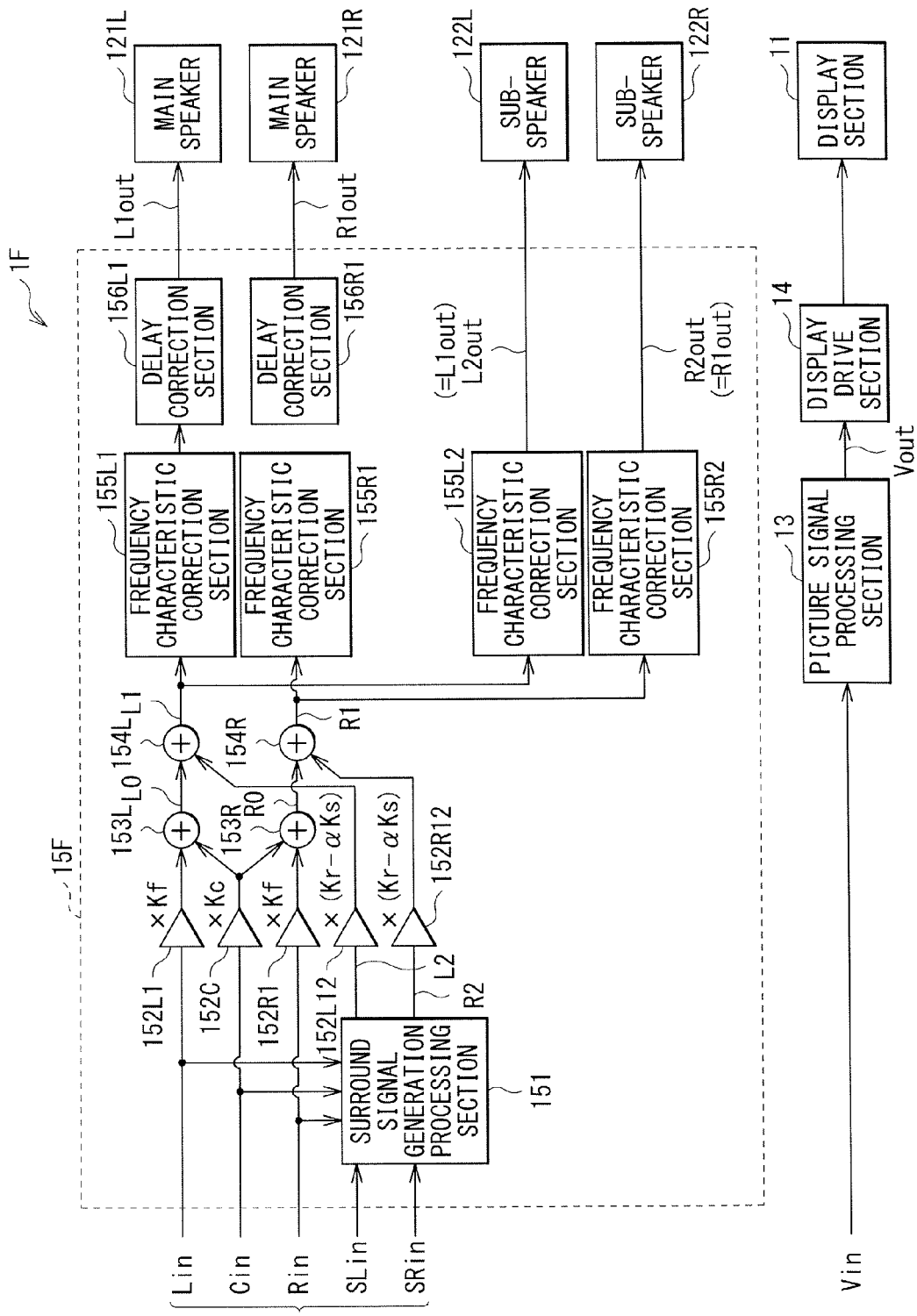

[ FIG. 20 ]
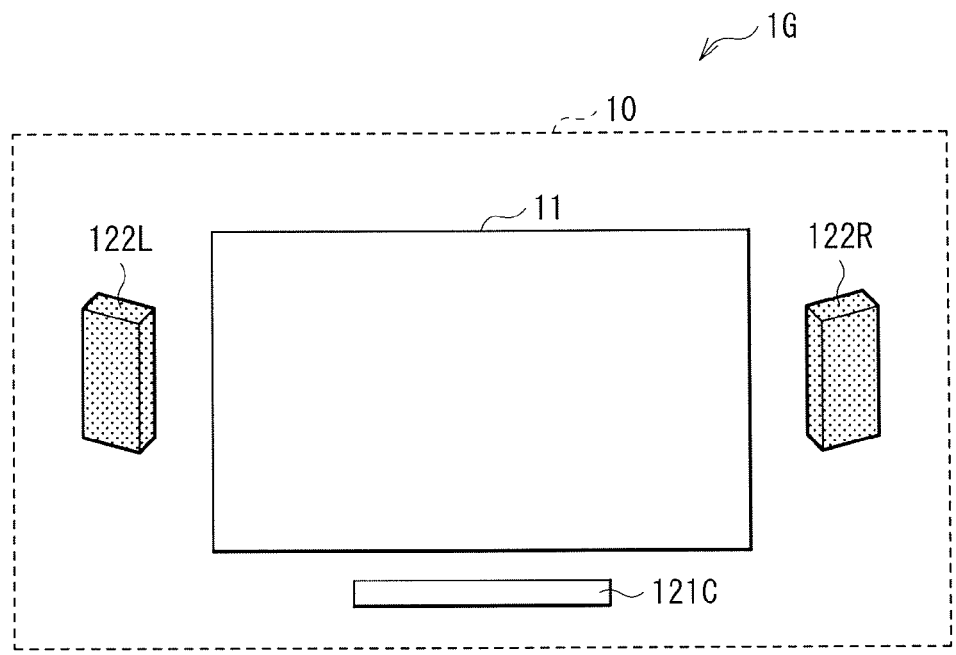
[ FIG. 21 ]
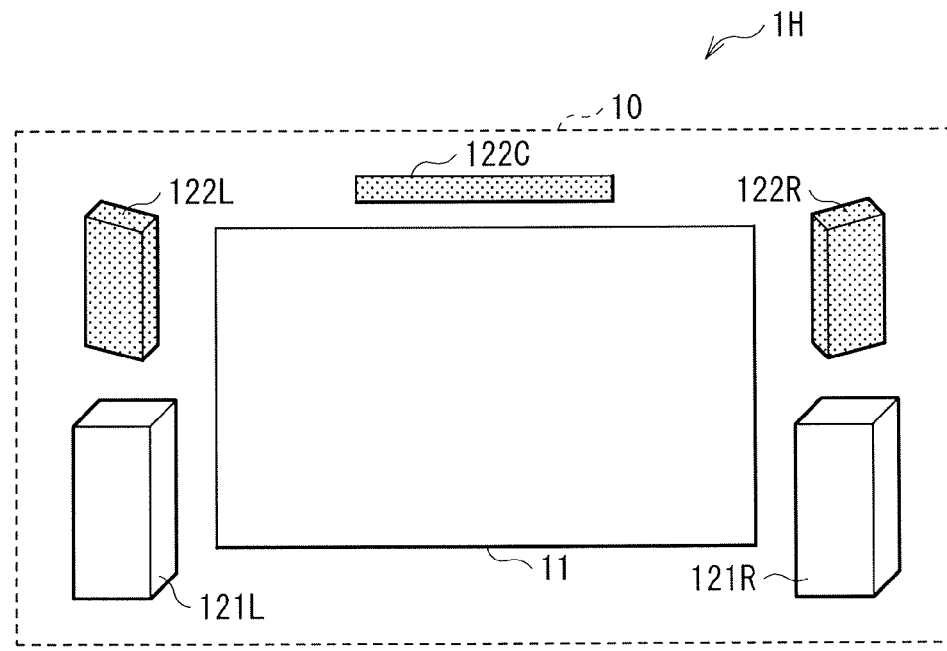

AUDIOVISUAL APPARATUS

CROSS-REFERENCE TO RELATED APPLICATION

The present application is a national phase entry under 35 U.S.C. § 371 of International Application No. PCT/JP2013/063758 filed May 17, 2013, published on Jan. 3, 2014, as WO 2014/002640 A1, which claims priority from Japanese Patent Application No. JP 2012-147644 filed in the Japanese Patent Office on Jun. 29, 2012.

TECHNICAL FIELD

The present disclosure relates to an audiovisual apparatus displaying a picture and generating sound.

BACKGROUND ART

Some of audiovisual apparatuses (audiovisual outputting apparatus) such as televisions (television receivers) and home theater sets include surround speakers in addition to a left-channel speaker and a right-channel speaker. In such an audiovisual apparatus, localization positions of sound images are allowed to be controlled by providing many speakers, and realistic sensation is largely improved. Here, the localization position of sound image is a position of a virtual sound source perceived by a viewer.

For example, in PTL 1 and PTL 2, there is proposed a television that includes a lot of speakers, arrangement of which are allowed to be arbitrarily changed depending on the purpose.

CITATION LIST

Patent Literature

PTL 1: Japanese Unexamined Patent Application Publication No. 2007-318301
PTL 2: Japanese Unexamined Patent Application Publication No. 2006-109241

SUMMARY OF INVENTION

Incidentally, in such an audiovisual apparatus, typically, further improvement of the realistic sensation is desired, and suggestion of an audiovisual apparatus capable of providing such realistic sensation effectively is desired.

It is thus desirable to provide an audiovisual apparatus capable of providing realistic sensation effectively.

According to an embodiment of the disclosure, there is provided an audiovisual apparatus including: a display section configured to display a picture; and one or a plurality of main speakers and a plurality of sub-speakers each having a sound output surface generating sound corresponding to the picture. The sound output surfaces of one or more of the plurality of sub-speakers are arranged to be inclined toward outside of the display section as compared with the sound output surfaces of the main speakers.

In the audiovisual apparatus according to the embodiment of the disclosure, the sound output surfaces of one or more of the plurality of sub-speakers are arranged to be inclined toward outside of the display section as compared with the sound output surfaces of the main speakers. Therefore, for example, as compared with the case where the sound output surfaces of the respective sub-speakers and the sound output surfaces of the main speakers are arranged so as to be aligned (so as to be parallel to each other), the viewing region providing realistic sensation is widened.

According to the audiovisual apparatus according to the embodiment of the disclosure, the sound output surfaces of one or more of the plurality of sub-speakers are arranged to be inclined toward the outside of the display section, as compared with the sound output surfaces of the main speakers. Therefore, it is possible to widen the viewing region providing realistic sensation, and to provide the realistic sensation effectively.

BRIEF DESCRIPTION OF DRAWINGS

FIG. 1 is a schematic diagram illustrating an appearance configuration example of an audiovisual apparatus according to an embodiment of the disclosure.

FIG. 2 is a schematic diagram illustrating an example of an arrangement configuration of speakers illustrated in FIG. 1.

FIG. 3 is a schematic diagram illustrating the arrangement configuration of the speakers illustrated in FIG. 2 as viewed from an upper surface side.

FIG. 4 is a schematic perspective view illustrating the arrangement configuration of the speakers illustrated in FIG. 2 and FIG. 3 in detail.

FIG. 5 is a block diagram illustrating a detailed configuration example of the audiovisual apparatus illustrated in FIG. 1.

FIG. 6 is a schematic perspective view illustrating a configuration of an audiovisual apparatus according to a comparative example.

FIG. 7 is a schematic diagram illustrating an example of a measuring method to set parameters for frequency characteristic correction relating to a main speaker.

FIG. 8 is a schematic diagram illustrating an example of a measuring method to set parameters for frequency characteristic correction relating to a sub-speaker.

FIG. 9A is a characteristic diagram illustrating an example of the frequency characteristic correction relating to the main speaker (before correction).

FIG. 9B is a characteristic diagram illustrating an example of the frequency characteristic correction relating to the main speaker (after correction).

FIG. 10A is a characteristic diagram illustrating an example of the frequency characteristic correction relating to the sub-speaker (before correction).

FIG. 10B is a characteristic diagram illustrating an example of the frequency characteristic correction relating to the sub-speaker (after correction).

FIG. 11 is a schematic diagram illustrating an example of a measuring method to set parameters for delay correction.

FIG. 12A is a timing chart illustrating an example of the delay correction (before correction).

FIG. 12B is a timing chart illustrating an example of the delay correction (after correction).

FIG. 13 is a schematic perspective view illustrating a configuration example of an audiovisual apparatus according to a modification 1.

FIG. 14 is a schematic diagram illustrating an arrangement configuration of speakers illustrated in FIG. 13 as viewed from an upper surface side.

FIG. 15 is a schematic diagram illustrating a configuration example of an audiovisual apparatus according to a modification 2.

FIG. 16 is a schematic diagram illustrating another configuration example of the audiovisual apparatus according to the modification 2.

FIG. 17 is a block diagram illustrating a configuration example of an audiovisual apparatus according to a modification 3.

FIG. 18 is a block diagram illustrating a configuration example of an audiovisual apparatus according to a modification 4.

FIG. 19 is a block diagram illustrating a configuration example of an audiovisual apparatus according to a modification 5.

FIG. 20 is a schematic diagram illustrating a configuration example of an audiovisual apparatus according to a modification 6.

FIG. 21 is a schematic diagram illustrating another configuration example of the audiovisual apparatus according to the modification 6.

DESCRIPTION OF EMBODIMENTS

Hereinafter, a preferred embodiment of the disclosure will be described in detail with reference to drawings. Note that description will be given in the following order.
1. Embodiment (an example in which sound output surfaces of sub-speakers are inclined toward outside of a display section)
2. Modifications
   Modification 1 (an example in which sound output surfaces of main speakers are additionally inclined toward inside of the display section)
   Modification 2 (another example relating to relative arrangement of the main speakers and the sub-speakers)
   Modification 3 (an example in a case where two-channel audio signals are input)
   Modification 4 (an example in which audio signal processing is performed without partial addition of surround audio signal components)
   Modification 5 (an example in which signals of the same kind as signals of the main speakers are supplied to the sub-speakers)
   Modification 6 (another example relating to the number of main speakers and the number of sub-speakers)
   Another Modifications

Embodiment

[Configuration of Audiovisual Apparatus 1]

FIG. 1 schematically illustrates an appearance configuration example of an audiovisual apparatus 1 according to an embodiment of the disclosure. The audiovisual apparatus 1 displays a picture and generates sound, and is configured as a television receiver (a television) in this example. The audiovisual apparatus 1 includes a display section 11, two main speakers 121L and 121R, two sub-speakers 122L and 122R, and a housing 10.

The housing 10 is an exterior member containing the display section 11, the main speakers 121L and 121R, the sub-speakers 122L and 122R, and the like. In other words, in the audiovisual apparatus 1, the speakers (the main speakers 121L and 121R and the sub-speakers 122L and 122R) are embedded in the apparatus (in the housing 10).

The display section 11 is a display panel performing picture display based on a picture signal, and for example, may be configured using display elements of various kinds of systems such as a liquid crystal element and an organic electroluminescence (EL) element. Specifically, in the display section 11, such a plurality of display elements are arranged in a matrix. In addition, in this example, the display section 11 has an anisotropic shape (a rectangular shape) in which an X-axis direction corresponds to a long-axis direction and a Y-axis direction corresponds to a short-axis direction.

(Main Speakers 121L and 121R)

The main speaker 121L is disposed on a left side of the display section 11 (on a left side as viewed from a user side), and the main speaker 121R is disposed on a right side of the display section 11 (on a right side as viewed from the user side). Each of the main speakers 121L and 121R has a sound output surface generating (outputting) sound corresponding to a picture displayed on the display section 11, and in this case, generates sound based on a main audio signal as will be described later. Moreover, a sound generation band (a sound reproduction band) of the main speakers 121L and 121R is a frequency band from a low frequency range (a low band) to a high frequency range (a high band) (for example, about 80 Hz to about 20 kHz), and thus covers a wide frequency band.

(Sub-Speakers 122L and 122R)

The sub-speaker 122L is disposed on the left side of the display section 11, and the sub-speaker 122R is disposed on the right side of the display section 11. The sub-speakers 122L and 122R have sizes smaller than (are downsized more than) those of the main speakers 121L and 121R, respectively, and function as auxiliary (additional) speakers. Each of the sub-speakers 122L and 122R also has a sound output surface generating sound corresponding to the picture displayed on the display section 11, and in this example, generates sound (containing surround audio signals as main components) based on the surround audio signals. Specifically, here, the main speakers 121L and 121R and the sub-speakers 122L and 122R generate sound based on the audio signals of different kinds from each other. In addition, the sound generation band of the sub-speakers 122L and 122R is a frequency band from a middle low frequency range (a middle low band) to the high frequency range (for example, about 400 Hz to about 20 kHz, or about 200 Hz to about 20 kHz), and thus covers the middle low band to the high band.

[Example of Arrangement Configuration of Speakers]

Subsequently, with reference to FIG. 2 to FIG. 4, an example of an arrangement configuration of the main speakers 121L and 121R and the sub-speakers 122L and 122R is described. FIG. 2 schematically illustrates the example of the arrangement configuration of the speakers in the housing 10 on an X-Y plane. FIG. 3 schematically illustrates the arrangement configuration of the speakers illustrated in FIG. 2 as viewed from the upper surface side (along a positive direction on the Y-axis). FIG. 4 is a schematic perspective view illustrating the arrangement configuration of the speakers illustrated in FIG. 2 and FIG. 3 in detail.

Note that, in FIG. 3 and FIG. 4, S1 indicates a display surface (X-Y plane) of the display section 11, and S21(L), S21(R), S22(L), and S22(R) indicate sound output surfaces of the main speakers 121L and 121R and the sub-speakers 122L and 122R, respectively. In addition, L indicates a normal (Z-axis direction) of the display section S1, and L21(L), L21(R), L22(L), and L22(R) indicate normals (axis lines) of the sound output surfaces S21(L), S21(R), S22(L), and S22(R), respectively. The same applies to subsequent other drawings.

First, as illustrated in FIG. 3, the main speakers 121L and 121R are disposed in a side surface direction (the left side and the right side, respectively) along the Y-axis of the display section 11. In addition, the sound output surfaces S21(L) and S21(R) of the main speakers 121L and 121R are planes (X-Y planes) parallel to the display surface S1, and direct a front direction of the audiovisual apparatus 1. In other words, the normal L1 of the display surface S1 and the normals L21(L) and L21(R) of the sound output surfaces S21(L) and S21(R) are parallel to each other (both are along the Z-axis direction).

On the other hand, as illustrated in FIG. 3, the sub-speakers 122L and 122R are also disposed in the side surface direction (the left side and the right side, respectively) along the Y-axis of the display section 11. Moreover, in this case, as illustrated in FIG. 4, the sub-speaker 122L is disposed on an upper side (a positive direction side along the Y-axis) of the main speaker 121L, and the sub-speaker 122R is disposed on the upper side of the main speaker 121R. Incidentally, in this case, as illustrated in FIG. 3, the main speakers 121L and 121R and the sub speakers 122L and 122R are arranged so as to be a front and a back relatively to each other, respectively. In other words, in this case, the sub-speakers 122L and 122R are disposed on a back surface side along the Z-axis (a negative direction side along the Z-axis) by a distance (a relative distance) d1 as compared with the main speakers 121L and 121R, respectively.

Moreover, in the present embodiment, as illustrated in FIG. 3, both of the sound output surfaces S22(L) and S22(R) of the sub-speakers 122L and 122R are arranged so as to be inclined toward the outside of the display section 11, as compared with the sound output surfaces S21(L) and S21(R) of the main speakers 121L and 121R. In other words, in this case, as described above, the sound output surfaces S21(L) and S21(R) and the display surface S1 direct the front surface direction of the audiovisual apparatus 1, whereas the sound output surfaces S22(L) and S22(R) are slightly rotated toward the outside (the left side and the right side, respectively) of the display section 11 with the Z-axis as a rotation axis (see FIG. 4). Specifically, as illustrated in FIG. 4, the normal L22(L) of the sound output surface S22(L) is inclined by an inclined angle θ2L toward the outside (the left side) of the display section 11 in the Z-X plane, as compared with the normal L21(L) (the Z-axis direction) of the sound output surface S21(L). Likewise, the normal L22(R) of the sound output surface S22(R) is inclined by an inclined angle θ2R toward the outside (the right side) of the display section 11 in the Z-X plane, as compared with the normal L21(R) (the Z-axis direction) of the sound output surface S21(R).

Incidentally, each of such inclined angles θ2L and θ2R may be desirably set to, for example, about 10 degrees; however, the inclined angles θ2L and θ2R may be arbitrarily adjustable independently of each other. More specifically, for example the inclined angles θ2L and θ2R may be adjusted based on a control signal that is input to the audiovisual apparatus 1 in response to operation by a user (manual operation using a remote controller or the like) or a control signal that is dynamically (automatically) generated depending on the location (a detected viewing position) of the user.

[Block Configuration of Audiovisual Apparatus 1]

Subsequently, FIG. 5 illustrates an example of a block configuration of such an audiovisual apparatus 1. For example, the audiovisual apparatus 1 may include the display section 11, the main speakers 121L and 121R, and the sub-speakers 122L and 122R that are described above, and may include a picture signal processing section 13, a display drive section 14, and an audio signal processing section 15 that will be described below. Moreover, a not-illustrated amplifier and a not-illustrated analog filter are provided in this order from the audio signal processing section 15 side on each of paths between the audio signal processing section 15 and any of the main speakers 121L and 121R and the sub-speakers 122L and 122R.

Incidentally, in this case, the case where 5.1 channel audio signals (input audio signals Lin, Rin, Cin, SLin, and SRin) are input to the audio signal processing section 15 from a not-illustrated sound source and an input picture signal Vin is input to the picture signal processing section 13 from a not-illustrated picture source is described as an example. Moreover, the input audio signals Lin, Rin, Cin, SLin, and SRin indicate a left channel signal, a right channel signal, a center channel signal, a surround left channel signal, and a surround right channel signal, respectively.

The picture signal processing section 13 may perform, on the input picture signal Vin, various kinds of picture signal processing such as gamma conversion processing, edge enhancement processing, contrast improvement processing, and motion picture blur suppression processing, and may generate and output an output picture signal Vout subjected to such picture signal processing.

The display drive section 14 performs display driving on the display section 11 based on the output picture signal Vout thus generated.

(Audio Signal Processing Section 15)

The audio signal processing section 15 generates the above-described main audio signals and the above-described surround audio signals based on the input audio signals Lin, Rin, Cin, SLin, and SRin. Specifically, the audio signal processing section 15 generates output audio signals L1out, R1out, L2out, and R2out that are to be supplied to the main speakers 121L and 121R and the sub-speakers 122L and 122R, respectively. The audio signal processing section 15 includes a surround signal generation processing section 151, attenuators 152L1, 152L2, 152R1, 12R2, 152C, 152L12, and 152R12, and adders 153L, 153R, 154L, and 154R. The audio signal processing section 15 further includes frequency characteristic correction sections 155L1, 155L2, 155R1, and 155R2, and delay correction sections 156L1 and 156R1.

The surround signal generation processing section 151 performs predetermined signal processing on the input audio signals Lin, Rin, Cin, SLin, and SRin to generate audio signals L2 and R2 that are surround audio signals.

The attenuator 152L1 uses a predetermined down-mix coefficient Kf to perform attenuation of the input audio signal Lin (Lin×Kf). Likewise, the attenuator 152R1 uses the predetermined down-mix coefficient Kf to perform attenuation of the input audio signal Rin (Rin×Kf). The attenuator 152C uses a predetermined down-mix coefficient Kc to perform attenuation of the input audio signal Cin (Cin×Kc).

The attenuator 152L2 uses a predetermined multiplier coefficient (an attenuation coefficient) Ks to perform attenuation of the audio signal L2 output from the surround signal generation processing section 151 (L2×Ks). Likewise, the attenuator 152R2 uses the predetermined multiplier coefficient to perform attenuation of the audio signal R2 output from the surround signal generation processing section 151 (R2×Ks).

The attenuator 152L12 uses a predetermined down-mix coefficient (Kr−α×Ks) to perform attenuation of the audio signal L2 output from the surround signal generation processing section 151 (L2×(Kr−α×Ks)). Likewise, the attenuator 152R12 uses the predetermined down-mix coefficient (Kr−α×Ks) to perform attenuation of the audio signal R2 output from the surround signal generation processing section 151 (R2×(Kr−α×Ks)). In this case, the coefficient (an adjustment coefficient) α at this time is a coefficient to adjust balance of volume feeling between the main speakers 121L and 121R and the sub-speakers 122L and 122R. More specifically, the value of the adjustment coefficient α is set so that volume feeling of total surround components by the all speakers is substantially equivalent to (is not largely different from) that in the case where typical two-channel speakers are used. In other words, the attenuation is performed at a ratio that is obtained by subtracting (α×Ks) from Kr, which prevents surround components from being excessive.

The adder 153L adds an audio signal output from the attenuator 152L1 to an audio signal output from the attenuator 152C to generate an audio signal L0 (a basic main audio signal). The adder 153R adds an audio signal output from the attenuator 152R1 to the audio signal output from the attenuator 152C to generate an audio signal R0 (a basic main audio signal).

The adder 154L adds the audio signal L0 output from the adder 153L to an audio signal output from the attenuator 152L12 to generate an audio signal L1 as a main audio signal. The adder 154R adds the audio signal R0 output from the adder 153R to an audio signal output from the attenuator 152R12 to generate an audio signal R1 as a main audio signal.

The frequency characteristic correction sections 155L1, 155R1, 155L2, and 155R2 perform correction (frequency characteristic correction) to planarize frequency characteristics of the main speakers 121L and 121R and the sub-speakers 122L and 122R, respectively. Specifically, the frequency characteristic correction section 155L1 performs such correction on the audio signal L1 output from the adder 154L to perform the frequency characteristic correction of the main speaker 121L. Likewise, the frequency characteristic correction section 155R1 performs such correction on the audio signal R1 output from the adder 154R to perform the frequency characteristic correction of the main speaker 121R. In addition, the frequency characteristic correction section 155L2 performs such correction on the audio signal output from the attenuator 152L2 to perform the frequency characteristic correction of the sub-speaker 122L, and generates the output audio signal L2out as the surround audio signal to be supplied to the sub-speaker 122L. Likewise, the frequency characteristic correction section 155R2 performs such correction on the audio signal output from the attenuator 152R2 to perform the frequency characteristic correction of the sub-speaker 122R, and generates the output audio signal R2out as the surround audio signal to be supplied to the sub-speaker 122R. Such frequency characteristic correction may be performed with use of, for example, a predetermined filter. Note that the term "frequency characteristics" as used herein refers to as characteristics indicating relationship between a frequency and both of gain and a phase of the output audio signal. In addition, the detail of such frequency characteristic correction will be described later.

The delay correction sections 156L1 and 156R1 each perform correction (delay correction) to decrease a delay difference between the main speakers 121L and 121R and the sub-speakers 122L and 122R caused by the above-described relative front-back arrangement (with the distance d1) therebetween in sound propagation. Specifically, the delay correction section 156L1 performs such delay correction on an audio signal output from the frequency characteristic correction section 155L1 to generate the output audio signal L1out as a main audio signal to be supplied to the main speaker 121L. Likewise, the delay correction section 156R1 performs such delay correction on an audio signal output from the frequency characteristic correction section 155R1 to generate the output audio signal R1out as a main audio signal to be supplied to the main speaker 121R. Such delay correction may be performed with use of, for example, a predetermined buffer. Note that the detail of such delay correction will be described later.

[Function and Effects of Audiovisual Apparatus 1]
(1. Basic Operation)

In the audiovisual apparatus 1, the picture signal processing section 13 performs the predetermined picture signal processing based on the input picture signal Vin supplied from the not-illustrated picture source, to generate the output picture signal Vout. Then, the display drive section 14 performs display driving based on the output picture signal Vout to perform picture display on the display section 11 based on the input picture signal Vin. In addition, the audio signal processing section 15 performs the predetermined audio signal processing based on the input audio signals Lin, Rin, Cin, SLin, and SRin supplied from the not-illustrated sound source, to generate the output audio signals L1out, R1out, L2out, and R2out. Then, the main speakers 121L and 121R generate sound based on the output audio signals L1out and R1out (the main audio signals), respectively. Moreover, the sub-speakers 122L and 122R generate sound based on the output audio signals L2out and R2out (the surround audio signals), respectively. In this way, the audiovisual apparatus 1 displays a picture and outputs sound corresponding to the picture.

(2. Function of Sub-Speakers 122L and 122R)

In the present embodiment, the main speakers 121L and 121R and the sub-speakers 122L and 122R are arranged in a manner illustrated in FIG. 2 to FIG. 4. In other words, the sound output surfaces S22(L) and S22(R) of the sub-speakers 122L and 122R are both arranged so as to be inclined toward the outside of the display section 11 as compared with the sound output surfaces S21(L) and S21(R) of the main speakers 121L and 121R, respectively.

Accordingly, in the audiovisual apparatus 1, for example, as compared with an audiovisual apparatus (an audiovisual apparatus 101) according to a comparative example illustrated in FIG. 6, the following function is obtainable. Specifically, as compared with the case where the sound output surfaces S22(L) and S22(R) and the sound output surfaces S21(L) and S21(R) are arranged (are arranged so as to direct the front side) so as to be aligned (so as to be parallel to each other) as with the audiovisual apparatus 101, a viewing region capable of providing realistic sensation is widened. This is for the following reasons. First, the audio components contributing to surround feeling (the audio components output from the sub-speakers 122L and 122R) are radiated (propagated) toward the outside of the display section 11, and are then superimposed with the main sound output from the main speakers 121L and 121R in space. As a result, unprecedented surround feeling is provided over a wide viewing region, and realistic sensation is allowed to be effectively provided.

(3. Audio Signal Processing)

Moreover, in the audiovisual apparatus 1, the audio signal processing section 15 performs the following audio signal processing to provide realistic sensation further effectively (to further enhance surround feeling).

First, in the present embodiment, audio signals obtained by adding a part of the surround audio signal components to the main audio signals are supplied to the main speakers 121L and 121R as the final main audio signals. More specifically, in the audio signal processing section 15, first, the audio signals L0 and R0 (the basic main audio signals)

and the audio signals L2 and R2 (the surround audio signals) are generated based on the input audio signals Lin, Rin, and Cin. Then, components of the audio signals L2 and R2 (the surround audio signal components) are partially added to the audio signals L0 and R0, respectively, to generate the audio signals L1 and R1 as the final main audio signals. The final main audio signals are generated in this way, which makes it possible to provide realistic sensation further effectively (to further enhance surround feeling).

In addition, at this time, the audio signal processing section 15 performs partial addition of the surround audio signal components described above with use of the adjustment coefficient α to adjust balance of volume feeling between the main speakers 121L and 121R and the sub-speakers 122L and 122R. More specifically, after the attenuation with use of the predetermined down-mix coefficient (Kr-α×Ks) is performed in the attenuators 152L12 and 152R12, the partial addition is performed by the adders 152L and 154R. In this way, the attenuation is performed at a ratio obtained by subtracting (α×Ks) from Kr, which prevents the surround components from becoming excessive, and therefore, the balance of volume feeling of the total surround components by all of the speakers is maintained.

(Frequency Characteristic Correction)

Moreover, the frequency characteristic correction sections 155L1, 155R1, 155L2, and 155R2 in the audio signal processing section 15 perform the frequency characteristic correction of the main speakers 121L and 121R and the sub-speakers 122L and 122R, respectively, as described above. At this time, parameters (such as a filter coefficient) used in such frequency characteristic correction are previously determined by measurement (measurement of sound from each speaker with use of a microphone 9) in a design phase, for example, in a manner illustrated in FIG. 7 and FIG. 8.

More specifically, for example, as illustrated in FIG. 7, the microphone 9 may be disposed in the vicinity of a sounding point (the sound output surface) of the main speaker 121L to measure an impulse response of the main speaker 121L, and then the inverse characteristics of the impulse response may be calculated to determine the frequency characteristics of the main speaker 121L. Likewise, for example, as illustrated in FIG. 8, the microphone 9 may be disposed in the vicinity of a sounding point (the sound output surface) of the sub-speaker 122L to measure an impulse response of the sub-speaker 122L, and then the inverse characteristics of the impulse response may be calculated to determine the frequency characteristics of the sub-speaker 122L. Note that the similar measuring method is used in the case of the main speaker 121R and the sub-speaker 122R to determine the frequency characteristics thereof.

Then, parameters (the filter coefficient and the like) of the frequency characteristic correction sections 155L1, 155L2, 155R1, and 155R2 are set so that the frequency characteristics determined in this way become flat.

With use of the parameters set in this way, the frequency characteristic correction sections 155L1 and 155R1 each may perform the frequency characteristic correction in a manner illustrated in FIGS. 9A and 9B, for example. Accordingly, the frequency characteristics of the main speakers 121L and 121R before the correction illustrated in FIG. 9A, for example, may become flat as with the frequency characteristics after the correction illustrated in FIG. 9B, for example. In addition, although not illustrated in FIG. 9B, the phase characteristics in the frequency characteristics also become flat (are equalized) in addition to the amplitude characteristics (the gain characteristics) in the frequency characteristics, which improves sound quality.

Likewise, the frequency characteristic correction sections 155L2 and 155R2 each may perform the frequency characteristic correction in a manner illustrated in FIGS. 10A and 10B, for example. As a result, the frequency characteristics of the sub-speakers 122L and 122R before the correction illustrated in FIG. 10A, for example, may become flat as with the frequency characteristics after the correction illustrated in FIG. 10B, for example.

By performing such frequency characteristic correction, in the present embodiment, degradation of surround effect caused by disturbance (non-flatness) of the frequency characteristics (occurrence of sound incongruity) is suppressed, and therefore, realistic sensation is allowed to be more effectively provided (surround feeling is further enhanced).

(Delay Correction)

Further, the delay correction sections 156L1 and 156R1 in the audio signal processing section 15 each perform the delay correction to decrease the delay difference between the main speakers 121L and 121R and the sub-speakers 122L and 122R caused by the relative front-back arrangement in sound propagation, as described above. At this time, parameters (such as the number of buffers) used in such delay correction may be previously determined by measurement (measurement of sound from each speaker using the microphone 9) in a design phase in a manner as illustrated in FIG. 11, for example.

More specifically, as illustrated in FIG. 11, the microphone 9 is disposed in the vicinity of a sounding point of each speaker, and the delay difference (a delay amount) between the main speakers 121L and 121R and the sub-speakers 122L and 122R in surround propagation is determined. Then, the parameters of the delay correction sections 156L1 and the 156R1 are set so that the delay difference previously determined in such a way is decreased (may be desirably eliminated).

With use of the parameters set in this way, the delay correction sections 156L1 and 156R1 each may perform the delay correction, for example, in a manner illustrated in FIGS. 12A and 12B. As a result, the delay difference (a delay time Δt) between the main speakers 121L and 121R and the sub-speakers 122L and 122R in sound propagation before the correction, for example, illustrated in FIG. 12A is decreased (in this example, is eliminated) in the results after the correction, for example, illustrated in FIG. 12B. More specifically, in this example, before the correction, in the sub-speakers 122L and 122R disposed relatively backward, delay in sound propagation by the delay time Δt occurs, as compared with the main speakers 121L and 121R. In other words, the sound reaches the user at the timing t1 when the sound is output from the main speakers 121L and 121R, whereas the sound reaches the user at the timing t2 (=t1+Δt) when the sound is output from the sub-speakers 122L and 122R. Therefore, in this example, as illustrated by a solid arrow in FIG. 12B, the delay correction sections 156L1 and 156R1 each add the delay time Δt to the audio signal on the path of the audio signals on the main speakers 121L and 121R side to eliminate such delay difference.

In the present embodiment, performing such delay correction suppresses degradation of surround effect (occurrence of sound incongruity) by the delay difference caused by the relative front-back arrangement between the main speakers 121L and 121R and the sub-speakers 122L and 122R in sound propagation. As a result, realistic sensation is allowed to be further effectively provided (is further enhanced).

Incidentally, for example, when a predetermined filter is disposed in the front-stage side of the delay correction sections 156L1 and 156R1 (in this example, when a filter is used in each of the frequency characteristic correction sections 155L1 and 155R1), the delay correction may be desirably performed in the following manner. Specifically, the delay correction sections 156L1 and 156R1 each may desirably perform the delay correction in consideration of the delay difference caused by such a filter in sound propagation. In this case, the delay difference is more appropriately decreased, and realistic sensation is allowed to be more effectively provided. Incidentally, in the case where there is configuration differences between the frequency characteristic correction sections 155L1 and 155R1 of the main speakers 121L and 121R and the frequency characteristic correction sections 155L2 and 155R2 of the sub-speakers 122L and 122R, the delay correction may be performed because the delay difference between the main speaker side and the sub-speaker side becomes an issue. In this example, such configuration differences indicate a case where types of the used filter (a finite impulse response (FIR) filter, an infinite impulse response (IIR) filter, and the like), the stage number thereof, and the like are different. Likewise, since there is a case where the frequency characteristics are varied in the amplifier and the analog filter, in such a case, it is sufficient to perform correction of the frequency characteristics of the entire audio system including a digital signal processor (DSP), the amplifier, and the analog filter, in addition to the speakers.

As described above, in the present embodiment, the sound output surfaces S22(L) and S22(R) of one or more of the plurality of sub-speakers (in this example, the sub-speakers 122L and 122R) are arranged so as to be inclined toward the outside of the display section 11 as compared with the sound output surfaces S21(L) and S21(R) of the main speakers 121L and 121R. Therefore, it is possible to widen the viewing region capable of providing realistic sensation, and to provide realistic sensation effectively.

Specifically, for example, it is possible to provide effect such that a picture and sound are integral and sound is output from the entire screen, appropriately to a large-screen television. Moreover, for example, the surround sound sources are clearly separated, and clear surround effect is allowed to be provided over a wide region. Further, for example, the surround components are spatially synthesized, which makes it possible to ensure a wide dynamic range, and to perform reproduction with less distortion.

<Modifications>

Subsequently, modifications (modifications 1 to 6) of the above-described embodiment will be described. Note that like numerals are used to designate like components in the embodiment, and the description thereof will be appropriately omitted.

[Modification 1]

FIG. 13 is a schematic perspective view illustrating a configuration example of an audiovisual apparatus (an audiovisual apparatus 1A) according to a modification 1. FIG. 14 is a diagram schematically illustrating an arrangement configuration of speakers in the audiovisual apparatus 1A as viewed from an upper surface side.

The audiovisual apparatus 1A of the present modification corresponds to modification of the arrangement configuration of the main speakers 121L and 121R in the audiovisual apparatus 1 of the above-described embodiment, and other configurations of the audiovisual apparatus 1A are similar to those of the audiovisual apparatus 1. Specifically, in the audiovisual apparatus 1A, the sound output surfaces of one or more (in this case, the main speakers 121L and 121R) of the main speakers are arranged so as to be inclined toward the inside of the display section 11, in addition to inclination arrangement of the sub-speakers 122L and 122R toward the outside of the display section 11.

Specifically, as illustrated in FIG. 14, the sound output surfaces S21(L) and S21(R) of the main speakers 121L and 121R are arranged so as to be inclined toward the inside of the display section 11 as compared with the display surface S1 (front surface direction). In other words, the sound output surfaces S21(L) and S21(R) are slightly rotated toward the inside (the right side and the left side) of the display section 11 with the Z-axis as a rotation axis (see FIG. 13). Specifically, as illustrated in FIG. 13, the normal L21(L) of the sound output surface S21(L) is inclined by an inclined angle θ1L toward the inside (the right side) of the display section 11 in the Z-X plane, as compared with the normal L1 (the Z-axis direction) of the display surface S1. Likewise, the normal L21(R) of the sound output surface S21(R) is inclined by an inclined angle θ1R toward the inside (the left side) of the display section 11 in the Z-X plane, as compared with the normal L1 (the Z-axis direction) of the display surface S1.

Incidentally, the inclined angles θ1L and θ1R may be desirably set to, for example, about 5 degrees to about 10 degrees; however, similarly to the above-described inclined angles θ2L and θ2R, the inclined angles θ1L and θ1R may also be arbitrarily adjustable independently of each other. Specifically, for example, similar to the above-described method, the inclined angles θ1L and θ1R may be adjusted based on a control signal input to the audiovisual apparatus 1A in response to operation by a user or a control signal dynamically generated depending on the location of the user.

As described above, in the present modification, in addition to the functional effect in the above-described embodiment (in which the viewing region providing realistic sensation is widened and surround feeling (the realistic sensation) is improved), it is possible to obtain effect in which sound field formation appropriate to the screen size becomes possible. Specifically, first, typically, there is a tendency that a width dimension of each of the speakers disposed on the left and the right of the display section is desired to be reduced as much as possible in order to reduce the dimensions of the entire apparatus and the like, as the screen size is increased. In such a case, since sound from the speaker with a small width is less spread out, in particular, localization (sound image localization) of the sound of middle high band to the screen center becomes unstable easily. The localization of the sound of middle high band to the screen center is important property for the television sound, such as localization of announcer's voice. Therefore, as with the present modification, the sound output surfaces S21(L) and S21(R) of the main speakers 121L and 121R are arranged so as to be inclined toward the inside of the display section 11, which makes it possible to stabilize such localization of the sound of the middle high band to the screen center. In other words, it becomes possible to achieve both of "center localization of human voice" and "sound spread and surround feeling", and effects similar to those in the case where a speaker with a large width allowing sound to be favorably spread is embedded are obtainable.

[Modification 2]

FIG. 15 and FIG. 16 schematically illustrate configuration examples (arrangement configurations of speakers) of audiovisual apparatuses (audiovisual apparatuses 1B and 1C, respectively) according to a modification 2 as viewed from an upper surface side. The audiovisual apparatuses 1B and 1C of the present modification each correspond to modification of relative arrangement of the main speakers 121L and 121R and the sub-speakers 122L and 122R in the audiovisual apparatus 1, and other configurations are similar to those of the audiovisual apparatus 1.

Specifically, in the audiovisual apparatus 1B illustrated in FIG. 15, in contrast to the audiovisual apparatus 1, the mail speakers 121L and 121R are disposed on a back surface side along the Z-axis (a negative direction side along the Z-axis) by a distance (a relative distance) d2 as compared with the sub-speakers 122L and 122R, respectively.

On the other hand, in the audiovisual apparatus 1C illustrated in FIG. 16, the main speakers 121L and 121R and the sub-speakers 122L and 122R are all disposed on the same axis along the Z-axis so that relative front-back arrangement does not occur.

As described above, the relative arrangement of the main speakers 121L and 121R and the sub-speakers 122L and 122R is allowed to be arbitrary set according to arrangement spaces of the respective components in the housing 10.

Incidentally, in the case of the audiovisual apparatus 1B, in contrast to the audiovisual apparatus 1, it is sufficient to perform, on the audio signals on the sub-speakers 122L and 122R side, the delay correction allowing the delay difference in sound propagation to be decreased. On the other hand, in the case of the audiovisual apparatus 1C, since the relative front-back arrangement does not occur as described above and thus the delay difference in sound propagation does not occur principally, it is unnecessary to perform the delay correction (however, in the case where the delay in the audio system other than the speakers is ignorable).

[Modification 3]

FIG. 17 illustrates a block configuration example of an audiovisual apparatus (an audiovisual apparatus 1D) according to a modification 3. The audiovisual apparatus 1D of the present modification corresponds to the audiovisual apparatus 1 provided with the audio signal processing section 15D in place of the audio signal processing section 15, and other configurations are similar to those of the audiovisual apparatus 1.

The audio signal processing section 15D corresponds to the audio signal processing section 15 further provided with a conversion processing section 150, and other configurations are similar to those of the audio signal processing section 15.

The conversion processing section 150 performs predetermined matrix conversion processing on two-channel audio signals (the input audio signals Lin and Rin) input from a not-illustrated sound source, to spuriously generate five-channel audio signals L, R, C, SL, and SR (pseudo surround components). Incidentally, thereafter, the audio signals L, R, C, SL, and SR function similarly to the input audio signals Lin, Rin, Cin, SLin, and SRin of the audio signal processing section 15, respectively.

With such a configuration, also in the present modification, effects similar to those of the above-described embodiment are allowed to be obtained by a function similar to that of the above-described embodiment.

[Modification 4]

FIG. 18 illustrates a block configuration example of an audiovisual apparatus (an audiovisual apparatus 1E) according to a modification 4. The audiovisual apparatus 1E of the present modification corresponds to the audiovisual apparatus 1 provided with an audio signal processing section 15E in place of the audio signal processing section 15, and other configurations are similar to those in the audiovisual apparatus 1.

The audio signal processing section 15 corresponds to the audio signal processing section 15 in which the attenuators 152L12 and 152R12 and the adders 154L and 154R are omitted (are not provided), and other configurations are similar to those of the audio signal processing section 15. In other words, in the audio signal processing section 15E, unlike the audio signal processing section 15, a part of the surround audio signal components is not added to the mail audio signals. Therefore, the audio signals L0 and R0 (the basic main audio signals) are used as the final main audio signals (the audio signals L1 and R1).

As described above, depending on the case, the main audio signals may be supplied to the main speakers 121L and 121R without being added with a part of the surround audio signal components.

[Modification 5]

FIG. 19 illustrates a block configuration example of an audiovisual apparatus (an audiovisual apparatus 1F) according to a modification 5. The audiovisual apparatus 1F of the present modification corresponds to the audiovisual apparatus 1 provided with an audio signal processing section 15F in place of the audio signal processing section 15, and other configurations are similar to those of the audiovisual apparatus 1.

The audio signal processing section 15F corresponds to the audio signal processing section 15 in which the attenuators 152L2 and 152R2 are omitted (are not provided) and the input signals to the frequency characteristic correction sections 155L2 and 155R2 are set to the audio signals L1 and R1, respectively, and other configurations are similar to those of the audio signal processing section 15. In other words, unlike the audio signal processing section 15, in the audio signal processing section 15F, the main speakers 121L and 121R and the sub-speakers 122L and 122R each generate sound based on the audio signals (in this example, the main audio signals) of the same kind as each other.

In the present modification with such a configuration, since the sound output surfaces S22(L) and S22(R) of the sub-speakers 122L and 122R are arranged so as to be inclined toward the outside of the display section 11, as compared with the sound output surfaces S21(L) and S21(R) of the main speakers 121L and 121R, it is possible to obtain the following functional effects. Specifically, in the present modification, since the sound is generated based on the audio signals (the main audio signals) of the same kind as each other, although the (wide range of) surround feeling as with the case where the processing on the main speaker side is performed independent of the processing on the sub-speaker side like the above-described embodiment is not obtainable, the viewing region providing realistic sensation is allowed to be widened similarly to the above-described embodiment, and the realistic sensation is allowed to be effectively provided.

Incidentally, a configuration in which a mode in which the sound is generated based on the audio signals of different kinds from each other described in the above-described embodiment and a mode in which the sound is generated based on the audio signals of the same kind as each other described in the present modification may be arbitrary switched automatically or manually may be employed.

[Modification 6]

FIG. 20 and FIG. 21 schematically illustrate configuration examples (examples of an arrangement configuration of speakers in the housing 10) of audiovisual apparatuses (audio visual apparatuses 1G and 1H, respectively) according to a modification 6 on the X-Y plane. The audiovisual apparatuses 1G and 1H of the present modification each correspond to the audiovisual apparatus 1 modified in the number of main speakers or the number of sub-speakers, and other configurations are similar to those of the audiovisual apparatus 1.

Specifically, in the audiovisual apparatus 1G illustrated in FIG. 20, one main speaker 121C is disposed on a lower side (at a center position) of the display section 11 in place of the two main speakers 121L and 121R of the audiovisual apparatus 1, and other configurations are similar to those of the audiovisual apparatus 1. In this case, the main speaker 121C functions as a center speaker mainly generating sound localized at a center, based on the main audio signals.

On the other hand, in the audiovisual apparatus 1H illustrated in FIG. 21, another sub-speaker 122C is disposed on an upper side (at a center position) of the display section 11 in addition to the two sub-speakers 122L and 122R of the audiovisual apparatus 1, and other configurations are similar to those of the audiovisual apparatus 1. In this case, the sub-speaker 122C functions as a center speaker generating sound based on the surround audio signals, and as for the sub-speaker 122C, the sound output surface thereof may not be arranged so as to be inclined toward the outside of the display section 11 depending on the case.

In this way, the number of main speakers and the number of sub-speakers are not limited to those described hereinbefore, and each may be arbitrary set.

[Other Modifications]

Hereinbefore, although the technology of the present disclosure has been described with reference to the embodiment and the modifications, the technology is not limited to the embodiments and the like, and various modifications may be made.

For example, in the above-described embodiment and the like, the block configuration of the audio signal processing section has been specifically described; however, the block configuration of the audio signal processing section is not limited thereto, and other block configurations may be used. Specifically, for example, depending on the case, the frequency characteristic correction section, the delay correction section, the surround signal generation processing section, and the like may be not provided. Moreover, the frequency characteristic correction may be performed only one of the main speakers 121L and 121R and the sub-speakers 122L and 122R.

Moreover, in the above-described embodiment and the like, the case where the speakers (the main speakers 121L and 121R and the sub-speakers 122L and 122R) are embedded in the apparatus (in the housing 10) has been described as an example; however, the configuration is not limited thereto. In other words, the main speakers and the sub-speakers each may be configured so as to be attachable from the outside to the housing 10 as dedicated speakers.

Note that the present technology may be configured as follows.

(1) An audiovisual apparatus including:
a display section configured to display a picture; and
one or a plurality of main speakers and a plurality of sub-speakers each having a sound output surface generating sound corresponding to the picture, wherein
the sound output surfaces of one or more of the plurality of sub-speakers are arranged to be inclined toward outside of the display section as compared with the sound output surfaces of the main speakers.

(2) The audiovisual apparatus according to (1), wherein the main speakers and the sub-speakers generate sound based on audio signals of different kinds from each other.

(3) The audiovisual apparatus according to (2), wherein the main speakers each generate sound based on main audio signals, and
the sub-speakers each generate sound based on surround audio signals.

(4) The audiovisual apparatus according to (3), further including
an audio signal processing section configured to generate the main audio signals and the surround audio signals based on input audio signals, the audio signal processing section generating basic main audio signals and the surround audio signals based on the input audio signals, and the audio signal processing section partially adding components of the surround audio signals to the basic main audio signals to generate the main audio signals.

(5) The audiovisual apparatus according to (4), wherein the audio signal processing section uses an adjustment coefficient to perform partial addition of the components of the surround signals, the adjustment coefficient being used to adjust balance of volume feeling between the main speakers and the sub-speakers.

(6) The audiovisual apparatus according to (1), wherein the main speakers and the sub-speakers generate sound based on audio signals of the same kind as each other.

(7) The audiovisual apparatus according to (6), wherein the main speakers and the sub-speakers both generate sound based on main audio signals.

(8) The audiovisual apparatus according to any one of (1) to (7), further including
a frequency characteristic correction section configured to perform correction to planarize frequency characteristics of one or both of the main speakers and the sub-speakers.

(9) The audiovisual apparatus according to any one of (1) to (8), further including
a delay correction section, wherein
the main speakers and the sub-speakers are disposed in relative front-back arrangement, and
the delay correction section is configured to perform correction to decrease a delay difference between the main speakers and the sub-speakers caused by the relative front-back arrangement in sound propagation.

(10) The audiovisual apparatus according to (9), wherein a predetermined filter is disposed in a front-stage side of the delay correction section, and
the delay correction section performs the correction in consideration of a delay difference caused by the filter in sound propagation.

(11) The audiovisual apparatus according to any one of (1) to (10), wherein the sound output surfaces of one or more of the one or the plurality of main speakers are arranged to be inclined toward inside of the display section.

(12) The audiovisual apparatus according to (11), wherein inclined angles of one or both of the main speakers and the sub-speakers are arbitrary adjustable.

(13) The audiovisual apparatus according to any one of (1) to (10), wherein inclined angles of the sub-speakers are arbitrary adjustable.

(14) The audiovisual apparatus according to (12) or (13), wherein the inclined angles are adjusted based on a control signal input in response to operation by a user or a control signal dynamically generated depending on a location of the user.

(15) The audiovisual apparatus according to any one of (1) to (14), wherein each of the sub-speakers is smaller in size than each of the main speakers.

(16) The audiovisual apparatus according to (15), wherein a sound generation band of the main speakers is a frequency band from a low frequency range to a high frequency range, and a sound generation band of the sub-speakers is a frequency band from a middle low frequency range to the high frequency range.

(17) The audiovisual apparatus according to any one of (1) to (16), wherein the main speakers and the sub-speakers are both disposed on a right side and a left side of the display sections, and the sub-speaker disposed on the right side and the sub-speaker disposed on the left side are both disposed to allow the respective sound output surfaces to be inclined toward outside of the display section.

(18) The audiovisual apparatus according to any one of (1) to (17), further including a housing containing the display section, the main speakers, and the sub-speakers.

This application is based upon and claims the benefit of priority of the Japanese Patent Application No. 2012-147644 filed in the Japan Patent Office on Jun. 29, 2012, the entire contents of this application are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An audiovisual apparatus comprising:
a display section configured to display a picture;
one or a plurality of main speakers and a plurality of sub-speakers each having a sound output surface generating sound corresponding to the picture; and
an audio signal processing section,
the sound output surfaces of one or more of the plurality of sub-speakers are arranged to be inclined toward outside of the display section as compared with the sound output surfaces of the main speakers,
the main speakers and the sub-speakers are configured to generate sound based on audio signals of different kinds from each other, in which the main speakers each generate sound based on main audio signals and the sub-speakers each generate sound based on surround audio signals,
the audio signal processing section configured to generate the main audio signals and the surround audio signals based on input audio signals, the audio signal processing section generating basic main audio signals and the surround audio signals based on the input audio signals, and the audio signal processing section partially adding components of the surround audio signals to the basic main audio signals to generate the main audio signals, and
the audio signal processing section configured to use an adjustment coefficient to perform partial addition of the components of the surround signals, the adjustment coefficient being used to adjust balance of volume output between the main speakers and the sub-speakers.

2. An audiovisual apparatus comprising:
a display section configured to display a picture;
one or a plurality of main speakers and a plurality of sub-speakers each having a sound output surface generating sound corresponding to the picture; and an audio signal processing section configured to adjust a balance of volume between the main speakers and the sub-speakers,
the sound output surfaces of one or more of the plurality of sub-speakers are arranged to be inclined toward outside of the display section as compared with the sound output surfaces of the main speakers,
each of the sub-speakers is smaller in size than each of the main speakers, and
wherein
a sound generation band of the main speakers is from a first frequency to a second frequency, and
a sound generation band of the sub-speakers is from a third frequency to the second frequency,
the first frequency being lower than the second frequency and lower than the third frequency, and
the second frequency being higher than the third frequency.

3. The audiovisual apparatus according to claim 2, in which the first frequency is about 80 Hz, the second frequency is about 20 kHz, and the third frequency is about 200 Hz or 400 Hz, such that the sound generation band of the main speakers is from about 80 Hz to about 20 kHz and the sound generation band of the sub-speakers is from about 200 or 400 Hz to about 20 kHz.

4. A display comprising:
a display section configured to display a picture;
one or a plurality of main speakers and at least one sub-speaker each having a sound output surface generating sound corresponding to the picture; and
an audio signal processing section,
the sound output surface of the at least one sub-speaker is arranged to be inclined toward outside of the display section as compared with the sound output surfaces of the main speakers,
the main speakers and the at least one sub-speaker are configured to generate sound based on audio signals of different kinds from each other, in which the main speakers each generate sound based on main audio signals and the at least one sub-speaker generates sound based on surround audio signals,
the audio signal processing section configured to generate the main audio signals and the surround audio signals based on input audio signals, the audio signal processing section generating basic main audio signals and the surround audio signals based on the input audio signals, and the audio signal processing section partially adding components of the surround audio signals to the basic main audio signals to generate the main audio signals, and
the audio signal processing section configured to use an adjustment coefficient to perform partial addition of the components of the surround signals, the adjustment coefficient being used to adjust balance of volume output between the main speakers and the at least one sub-speaker.

5. The display according to claim 4, wherein one of the at least one sub-speaker is at a center lateral position of the display section.

6. The display according to claim 4, wherein there are at least three of sub-speakers.

7. A display comprising:
a display section configured to display a picture;
one or a plurality of main speakers and at least one sub-speaker each having a sound output surface generating sound corresponding to the picture; and an audio signal processing section configured to adjust a balance of volume between the main speakers and the at least one sub-speaker, the sound output surface of the at least one sub-speaker is arranged to be inclined toward outside of the display section as compared with the sound output surfaces of the main speakers, the at least one sub-speaker is smaller in size than each of the main speakers, and wherein a sound generation band of the main speakers is from a first frequency to a second frequency, and a sound generation band of the at least one sub-speaker is from a third frequency to the second frequency, the first frequency being lower than the second frequency and lower than the third frequency, and the second frequency being higher than the third frequency.

8. The display according to claim 7, in which the first frequency is about 80 Hz, the second frequency is about 20 kHz, and the third frequency is about 200 Hz or 400 Hz, such that the sound generation band of the main speakers is from about 80 Hz to about 20 kHz and the sound generation band of the sub-speakers is from about 200 or 400 Hz to about 20 kHz.

9. The display according to claim 7, wherein one of the at least one sub-speaker is at a center lateral position of the display section.

10. The display according to claim 7, wherein there are at least three of sub-speakers.

\* \* \* \* \*